(12) United States Patent  (10) Patent No.: US 7,844,993 B2
Yoshizawa  (45) Date of Patent: Nov. 30, 2010

(54) IMAGE PROCESSING APPARATUS, NETWORK SYSTEM, AND METHOD OF COMMUNICATION

(75) Inventor: Fumio Yoshizawa, Chiba (JP)

(73) Assignee: Ricoh Company, Ltd., Tokyo (JP)

( * ) Notice: Subject to any disclaimer, the term of this patent is extended or adjusted under 35 U.S.C. 154(b) by 1332 days.

(21) Appl. No.: 11/349,151

(22) Filed: Feb. 8, 2006

(65) Prior Publication Data

US 2006/0200850 A1   Sep. 7, 2006

(30) Foreign Application Priority Data

Mar. 4, 2005   (JP)   ............................. 2005-061588

(51) Int. Cl.
  *H04N 7/173* (2006.01)
  *G05B 19/418* (2006.01)
  *G06F 9/46* (2006.01)
  *G06F 21/00* (2006.01)
(52) U.S. Cl. ................ 725/110; 705/8; 705/9; 713/184
(58) Field of Classification Search ................. 358/300; 705/8, 9; 707/530; 725/110, 111, 112, 50; 713/184; 715/202, 211
See application file for complete search history.

(56) References Cited

U.S. PATENT DOCUMENTS

| 6,363,352 B1* | 3/2002 | Dailey et al. .................... 705/9 |
| 6,732,103 B1* | 5/2004 | Strick et al. ................... 707/10 |
| 2001/0052077 A1* | 12/2001 | Fung et al. .................. 713/184 |

FOREIGN PATENT DOCUMENTS

| JP | 11-155051 | 6/1999 |
| JP | 2000-69133 | 3/2000 |
| JP | 2001-358887 | 12/2001 |
| JP | 2002-208078 | 7/2002 |

\* cited by examiner

*Primary Examiner*—Edward L Coles
*Assistant Examiner*—Neil R McLean
(74) *Attorney, Agent, or Firm*—Oblon, Spivak, McClelland, Maier & Neustadt, L.L.P.

(57) ABSTRACT

A plurality of image processing apparatuses and a management server are connected to an IP network. Upon receiving the IP address of an image processing apparatus, the management server assigns identification information corresponding to its IP address, for a predetermined limited period. If a user inputs identification information of a destination apparatus during the predetermined limited period, the image processing apparatus transmits processed image information to the destination apparatus that is connected to the IP network.

8 Claims, 8 Drawing Sheets

IMAGE PROCESSING APPARATUS, NETWORK SYSTEM, AND METHOD OF COMMUNICATION

CROSS-REFERENCE TO RELATED APPLICATIONS

The present document incorporates by reference the entire contents of Japanese priority document, 2005-061588 filed in Japan on Mar. 4, 2005.

BACKGROUND OF THE INVENTION

1. Field of the Invention

The present invention relates to an image processing apparatus and a network system for transmitting image information related to a read document, via an Internet protocol (IP) network, to a destination specified by a simple destination specification.

2. Description of the Related Art

During a telephone conversation, it is not always possible to achieve a sufficient agreement merely through the telephone conversation, and an immediate exchange of written text with the conversing party is sometimes desired.

For example, while discussing business with a client on the telephone, a sales representative may wish to give information material such as a pamphlet to the client and continue the discussion while looking at the material. Rather than reading out the contents of the pamphlet over the telephone, such information can be more fully understood by providing a copy of the actual information material.

During a telephone conference, it is desirable to immediately exchange conference papers with participants in the other party's conference room, and to continue the conference with all participants viewing the papers together. Conference papers are usually distributed in advance for remote telephone conferences. However, for example, during question-and-answer sessions, it is often necessary to disclose unexpected papers, in which case, the content of the papers must be explained verbally during the telephone conference although their content could be understood more quickly and fully by handing over the papers.

When housewives and the like are chatting on the telephone, they may wish to exchange magazine articles, advertisements, and the like, while talking. For example, when they are deciding on which hotel to stay at, which restaurant to dine at, and the like, it is more convenient for them to copy and share information from magazine articles and advertisements.

One way of achieving such communication using only existing public lines could be where two public lines are used, one for talking and the other for transmitting and receiving facsimiles. When paper text must be exchanged during the conversation, it is transmitted and received by facsimile. Moreover, because text data and audio data are exchanged through separate lines, the conversation is not interrupted.

However, since two public lines are required, equipment investment and communication cost increase. Moreover, by transmitting and receiving paper text by facsimile, required image quality may not be obtained due to the resolution, the gradation, and the like.

Another way of achieving this communication is by using an existing public line and an IP network, the public line for audio conversation and the IP network for exchanging paper texts. When a paper text needs to be shared during the conversation, the text to be handed over is read with a scanner to create an electronic file, and this electronic file is sent by an email from a personal computer to a personal computer of the other party. A person who receives the email views the electronic file by reproducing it on a display of the computer or on paper.

These operations of creating and viewing the electronic file, transmitting and receiving the email, and the like, must be performed during the conversation, which interrupts the conversation and is inconvenient.

Hence, there is a demand for a technique for exchanging a paper text with another party over a telephone conversation by a simple operation.

In the 1990s, techniques known as Internet Protocol Version 6 (IpV6) and Universal Plug and Play (UPnP) were proposed, and these techniques are still being developed today. Through proliferation of these techniques, various devices connected to an IP network will be able to recognize each other and exchange information.

These techniques are not exceptional to image processing apparatuses, and in the near future, it is expected that various image processing apparatuses will be able to recognize each other and exchange image information by an end-to-end method. For example, an application for real-time printing of an image read by a scanner of a copier on a printer of another copier at a distant location (hereinafter, "copia-to-copia") is anticipated.

To realize copia-to-copia, a process of confirming a communication destination is important in improving usability. For example, in a conventional facsimile communication, as shown in FIG. 7, the owner of a text confirms the communication destination by inputting a telephone number of a facsimile apparatus of the party to whom the text is sent.

As shown in FIG. 8, when this method is applied in copia-to-copia, the owner of the text confirms the communication destination by inputting an IP address or a media access control (MAC) address of a copier of the party to whom the text is sent, or a unique name that resolves the address.

However, IP addresses and MAC addresses are extremely complex and difficult to remember. For example, an IP address for IPv6 IP consists of a 128-bit identification code and a MAC address consists of a 48-bit identification code. Consequently, users often make typing errors while inputting an IP address, a MAC address, and the like in an attempt to confirm the communication destination, and are unable to reach the correct communication destination. Though the unique name that resolves the address is easier to remember, it is complicated and troublesome for the user to input the unique name that includes a combination of letters, numbers, and symbols, using a small number of hard keys on the copier and soft keys displayed on a liquid crystal screen.

In copia-to-copia, sometimes it is difficult to connect to any copier by correctly inputting the IP address, the MAC address, or the unique name. That is, although recent applications that use IP networks to exchange textual information (emails) are proliferating worldwide, there is an unending problem of a great number of malicious transmissions of advertisements and solicitations to unspecified majority by email (junk mail). In particular, junk mail is sometimes related to crimes such as fraud, and is becoming a social problem.

Therefore, unilateral transmissions of texts such as a direct mail from unidentified parties must be prevented to realize copia-to-copia.

Therefore, the method of confirming the communication destination by directly inputting unique identification information appended to each copier is not always suitable for copia-to-copia. There is a demand for a technique for preventing mistakes in communication destinations arising from operational errors made by users and unilateral distribution of texts from unidentified parties.

Techniques in which image processing apparatuses use communication lines to transmit and receive image information include linking functions of copiers and facsimiles. Following conventional techniques are proposed for simplifying the operation executed by the user when connecting to a communicating party by using these image processing apparatuses.

For example, Japanese Patent Application Laid-Open No. 2000-69133 proposes a communication system in which a telephone number of a connection destination facsimile is obtained by using a telecommunications service inquiry (TSI) and registered in a phonebook of the self apparatuses, thereby eliminating manual registration of the phonebook by the user.

Japanese Patent Application Laid-Open No. H11-155051 proposes a facsimile apparatus that uses a caller ID announcement service to obtain a telephone number of a caller, and, if the number is not registered in a phonebook of the facsimile apparatus, stores a received text in an image memory and does not output the text on paper until a user of the facsimile apparatus issues a command to permit printing. If the telephone number of the caller is registered as "reject caller" in the phonebook of the facsimile apparatus, the incoming call is rejected. According to this conventional technique, the user can select the texts from trusted parties, and necessary texts only, for paper output.

However, each of these conventional techniques uses an identification number that is unique to each communication terminal (the telephone number of the communicating party), and consequently, there is a need to further improve the usability in copia-to-copia using an IP network and to reliably prevent unwanted transmissions from unfavorable parties.

SUMMARY OF THE INVENTION

It is an object of the present invention to at least solve the problems in the conventional technology.

According to one aspect of the present invention, an image processing apparatus having its own IP address and connected to an IP network to which a management server is connected, the management server assigning identification information to the image processing apparatus corresponding to its IP address for a predetermined limited period, the identification information being simpler than the IP address, and all connections being based on IP addresses, the image processing apparatus including an address informing unit that informs the IP address of the image processing apparatus to the management server via the IP network; an image processing unit that executes predetermined image processing of image information that is obtained by optically reading a document; a transmitting/receiving unit that transmits/receives processed image information to another image processing apparatus connected to the IP network; and a connection control unit that, when the management server assigns the identification information, connects to the IP network during the predetermined limited period using the identification information, informs identification information of a communicating image processing apparatus to the management server, acquires and stores the IP address corresponding to the identification information of the communicating image processing apparatus, and when the identification information of the communicating image processing apparatus is input by a user, requests connection to the IP network using stored IP address of the communicating image processing apparatus, for any one of transmitting and receiving the processed image information.

According to another aspect of the present invention, a network system, including an IP network in which all connections are based on IP addresses; a plurality of image processing apparatuses connected to the IP network and each having its own IP address; and a management server connected to the IP network, and that assigns identification information to an image processing apparatus corresponding to its IP address for a predetermined limited period, the identification information being simpler than the IP address; where a first image processing apparatus executes predetermined image processing of image information that is obtained by optically reading a document, and transmits/receives processed image information to a second image processing apparatus connected to the IP network, each image processing apparatus informs its own IP address to the management server via the IP network, the management server assigns the identification information to each image processing apparatus that informs its IP address, and each image processing apparatus connects to the IP network during the predetermined limited period using its own identification information, informs identification information of a communicating image processing apparatus to the management server, acquires and stores the IP address corresponding to the identification information of the communicating image processing apparatus, and when the identification information of the communicating image processing apparatus is input by a user, requests connection to the IP network using stored IP address of the communicating image processing apparatus, for any one of transmitting and receiving the processed image information.

According to still another aspect of the present invention, a method of communication for exchanging processed image information within an IP network in which all connections are based on IP addresses, where a management server is connected via the IP network to a plurality of image processing apparatuses each having its own IP address, the method including the image processing apparatus informing the management server of its own IP address; the management server assigning to the image processing apparatus, after the act of informing, identification information corresponding to its IP address for a predetermined limited period, the identification information being simpler than the IP address; the image processing apparatus informing identification information of a communicating image processing apparatus to the management server, acquiring and storing an IP address corresponding to the identification information of the communicating image processing apparatus; and the image processing apparatus transmitting/receiving processed image information to the communication image processing apparatus using stored identification information.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of the present invention will be explained in detail below, with reference to the accompanying drawings. Though the following embodiments will be described with various technically preferable limitations because they are the exemplary embodiments of the invention, the scope of the invention is not limited to the explained embodiments, unless otherwise specified.

Figure 1:
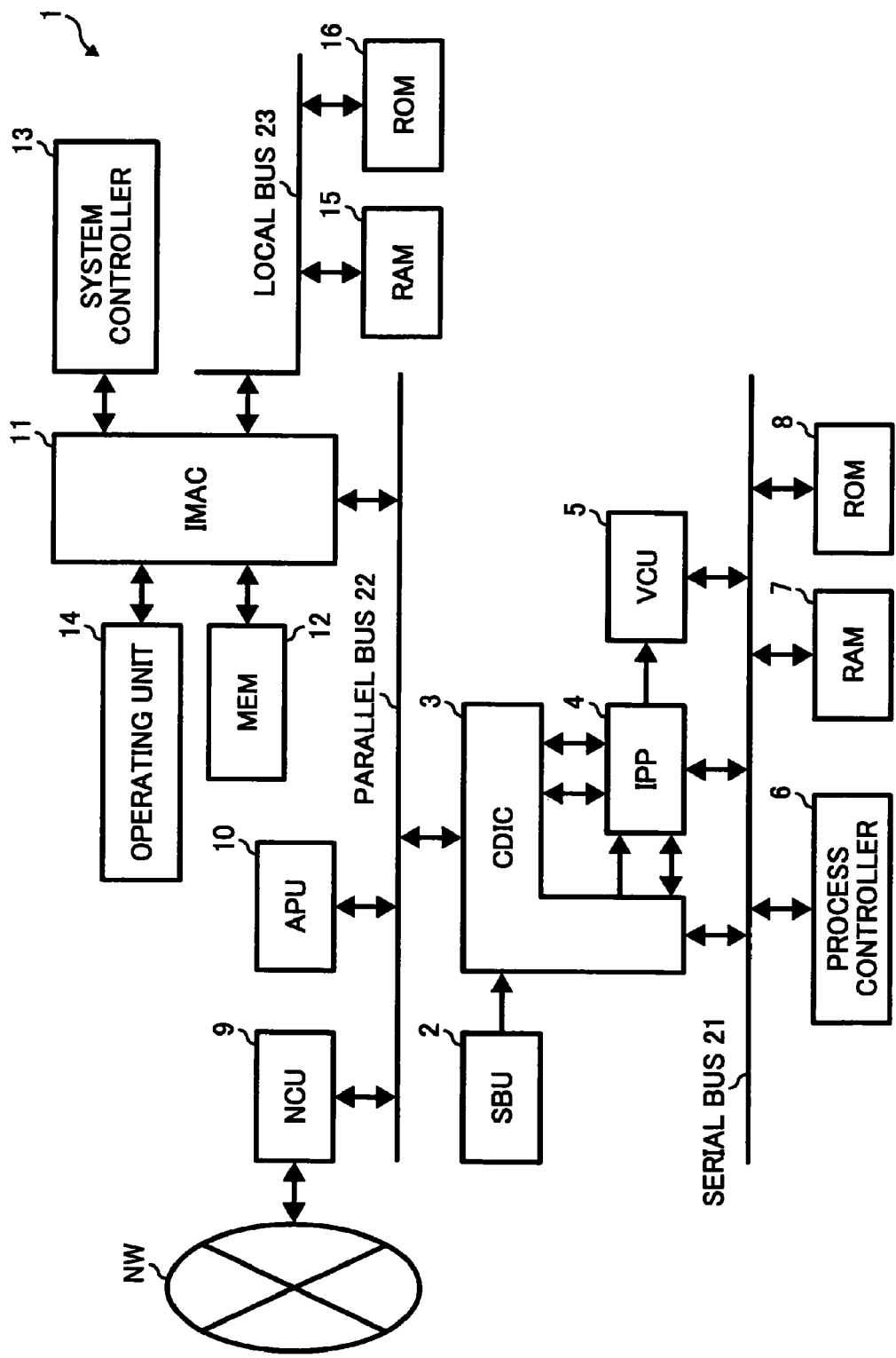
FIG. 1 is a circuit block diagram of an image processing apparatus to which an embodiment of the present invention is applied.

FIGS. 1 to 6 depict an embodiment of an image processing apparatus and a network system according to the present invention. FIG. 1 is a circuit block diagram of an image processing apparatus 1, to which the embodiment of the present invention is applied.

In FIG. 1, the image processing apparatus 1 includes a sensor board unit (SBU) 2, a compression/decompression and data interface controller (CDIC) 3, an image processing processor (IPP) 4, a video control unit (VCU) 5, a process controller 6, a random access memory (RAM) 7, a read only memory (ROM) 8, a network control unit or a network controller (NCU) 9, an automatic payment unit (APU) 10, an image memory access controller (IMAC) 11, a memory group (MEM) 12, a system controller 13, an operating unit 14, a RAM 15, a ROM 16. The SBU 2, the CDIC 3, the IPP 4, the VCU 5, the process controller 6, the RAM 7, and the ROM 8 are connected to a serial bus 21. The NCU 9, the APU 10, the IMAC 11, and the CDIC 3 are connected to a parallel bus 22. The IMAC 11, the RAM 15, and the ROM 16 are connected to a local bus 23.

Figure 2:
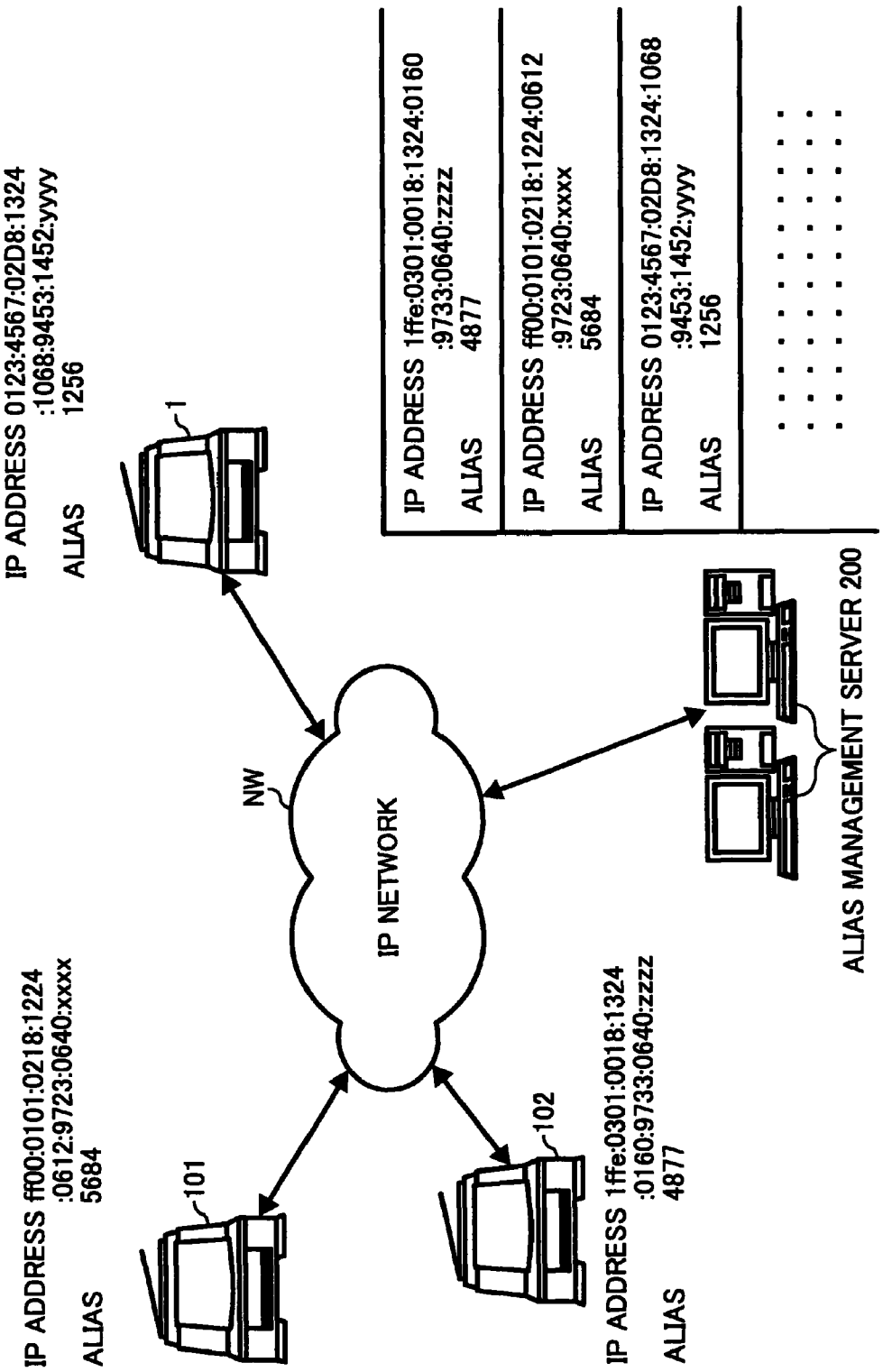
FIG. 2 is a configuration diagram of an IP network system to which the image processing apparatus shown in FIG. 1 is connected.
Figure 3:
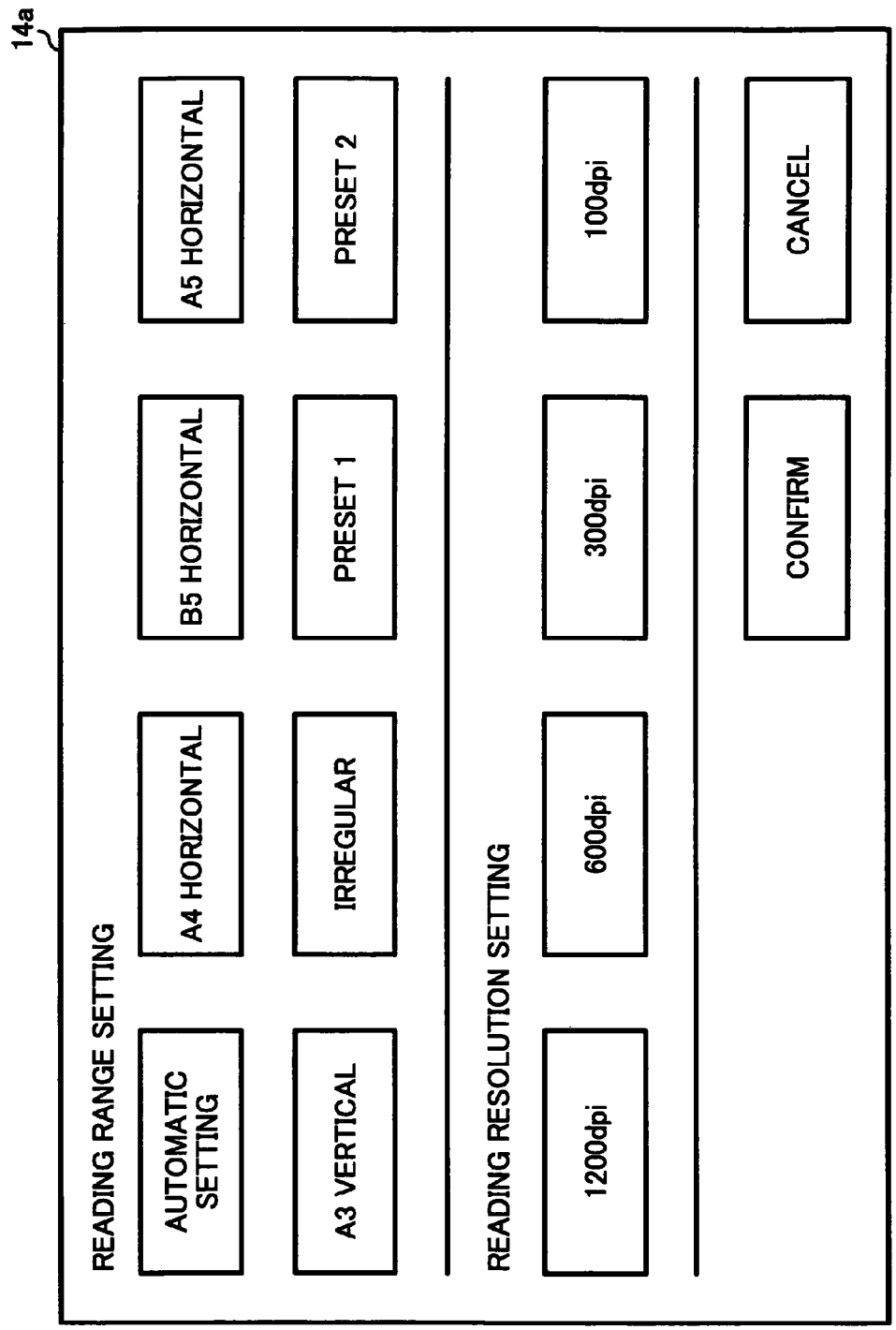
FIG. 3 is a plan view of a liquid crystal screen of an operating unit of the image processing apparatus shown in FIG. 1, for displaying a reading conditions setting screen.

As an example shown in FIG. 2, the image processing apparatus 1 of this embodiment is connected to an IP network NW, and can connect, via the IP network NW, to other image processing apparatuses 101 and 102. The image processing apparatus 1 can also connect to an alias management server (management server) 200. As explained below, image information is transmitted and received between the image processing apparatuses 101 and 102 by copia-to-copia.

The image processing apparatus 1 performs basic operations such as a scan to memory operation, a memory to print operation, a memory to network operation, a network to memory operation, an apply operation, a find operation, a connect operation, and a disconnect operation.

When executing a plurality of jobs in parallel, the image processing apparatus 1 allocates right of use for these jobs to the SBU 2, the VCU 5, and the parallel bus 22. This allocation is controlled by the system controller 13 and the process controller 6. The process controller 6 controls the flow of digital image signals. The system controller 13 controls the entire system and manages the activation of each resource.

The process controller 6 and the system controller 13, particularly the system controller 13, function as control units.

The system controller 13 and the process controller 6 mutually communicate via the parallel bus 22, the CDIC 3, and the serial bus 21. The CDIC 3 converts data formats for data interface between the parallel bus 22 and the serial bus 21. That is, the process controller 6 controls the operations of the SBU 2, the CDIC 3, the IPP 4, and the VCU 5, performs necessary settings thereon, and monitors their activation, termination, processing progress, and the like. The system controller 13 controls the IMAC 11, the NCU 9, the MEM 12, the operating unit 14, and the APU 10, performs necessary settings thereon, and monitors their activation, termination, and processing progress.

Information required when the SBU 2, the CDIC 3, the IPP 4, the VCU 5, and the process controller 6 execute processing is stored in the RAM 7 and the ROM 8, both of which connect to the serial bus 21. For example, the size of the image read by the SBU 2 and the optical characteristics of a charge coupled device (CCD), and parameters and the like of image processing executing by the IPP 4, are stored in the RAM 7 and the ROM 8. When a processor is mounted in the SBU 2, the CDIC 3, the IPP 4, the VCU 5, and the process controller 6, a program that defines operations of the processor is also stored in the RAM 7 or the ROM 8.

The RAM 15 and the ROM 16 that are connected by the local bus 23 to the IMAC 11 store information required in processing that is executed by the system controller 13, the IMAC 11, the operating unit 14, the MEM 12, the NCU 9, and the APU 10. For example, the RAM 15 and the ROM 16 store textual information and bitmap information for displaying letters and drawings on a liquid crystal screen 14a of the operating unit 14 (see FIGS. 3 and 4), the total amount and the remaining amount of digital image data that can be stored in the MEM 12, protocol information and address information for the NCU 9 to access external terminals, information input by a user via the operating unit 14, and the like. When a processor is mounted in the IMAC 11, the MEM 12, the NCU 9, the APU 10, the operating unit 14, and the system controller 13, a program that defines operations of the processor is also stored in the RAM 15 or the ROM 16.

The SBU 2 optically reads a document by irradiating reading light from a light source onto the text, and collecting the light reflected from the text in a light-receiving element such as a CCD via a mirror and a lens. The light-receiving element scans the text and reads images from the text by photoelectrically converting an incident light. The image is converted into an analog electrical signal and quantized, and is sent as digital image data to the CDIC 3.

The CDIC 3 controls all image data transmissions between functional devices and data buses, and performs data transfer between the SBU 2, the parallel bus 22, and the IPP 4. The CDIC 3 also performs communications between the system controller 13 that controls the entire image processing apparatus 1, and the process controller 6 that controls the processing of image data. The CDIC 3 transfers the image signals from the SBU 2 to the IPP 4.

The IPP 4 processes digital image data, optimizes frequency characteristics, gradation characteristics, and the like of the digital image data according to preferences of the user and characteristics of the apparatus itself, and sends the digital image data again to the CDIC 3.

The VCU 5 reproduces the image on paper. Based on the digital image data, the VCU 5 determines the position, the size, and the color, of dots to be printed on the paper, and prints the dots accordingly.

The operating unit 14 includes the liquid crystal screen 14a (see FIGS. 3 and 4), various types of keys for executing various types of commands for the image processing apparatus 1, and the like. According to the command issued using the operating unit 14, the system controller 13 controls respective parts of the image processing apparatus 1, and also controls the basic processing of the image processing apparatus 1 and copia-to-copia processing.

The IMAC 11 compresses the received digital image signal and then stores the compressed data in the MEM 12. The IMAC 11 also reads the stored data from the MEM 12 when required, decompresses the read data, and then sends the data to the IPP 4 via the parallel bus 22 and the CDIC 3.

The MEM 12 stores digital image data, momentarily storing the image data read by the SBU 2, and the image data sent via the IP network NW from the other image processing apparatuses 101 and 102, and the like.

The NCU 9 is connected to the IP network NW, and transmits and receives digital data to and from other terminals that are connected to the IP network NW, for example, the image processing apparatuses 101 and 102, and the alias management server 200. At the time of transmitting, the NCU 9 processes the data in compliance with a communication protocol of the IP network NW, and outputs the processed data to the IP network NW. At the time of receiving, the NCU 9 reproduces the original data from the received data processed in compliance with the communication protocol of the IP network NW.

The APU (automatic payment unit) 10 collects usage fees from users of the image processing apparatus 1. The APU 10 includes a slot for banknotes and coins, and a tray that returns change, enabling users to pay their fees in advance. The APU 10 makes a collection each time a fee is charged, and if there is a balance after all operations are done, returns the balance as change. The APU collects the usage fees from any one or both of the user of the image processing apparatus 1 and users of the image processing apparatuses 101 and 102 as the communicating parties, according to a predetermined ratio.

The image processing apparatus 1 then performs the basic operations such as the scan to memory operation, the memory to print operation, the memory to network operation, the network to memory operation, the apply operation, the find operation, the connect operation, and the disconnect operation.

In the scan to memory operation, the SBU 2 reads a document, and digital image data relating to the read document is stored in the MEM 12. The user sets the text document on a document glass of the SBU 2. For example, various reading conditions are set via the liquid crystal screen 14a of the operating unit 14 shown in FIG. 3. When a confirm button is pressed, the reading conditions set by the user are sent to the process controller 6 and the system controller 13. The process controller 6 stores the received reading conditions in the RAM 7, and instructs the SBU 2, the CDIC 3, and the IPP 4 to execute operations based on the reading conditions. The system controller 13 stores the received reading conditions in the RAM 15, and instructs the IMAC 11 and the MEM 12 to execute operations based on the reading conditions.

After the instructions to the respective units are completed, the SBU 2 of the image processing apparatus 1 reads the text document that is set oh the document glass, and sends the read digital image data to the CDIC 3. The CDIC 3 sends the digital image data received from the SBU 2 to the IPP 4. The IPP 4 executes image processing to supplement the optical characteristics of the SBU 2, and sends the processed digital image data to the CDIC 3. The CDIC 3 sends the digital image data, received from the IPP 4, to the IMAC 11 via the parallel bus 22. The IMAC 11 converts the received digital image data to a format that can be stored in the MEM 12, and stores the digital image data in the MEM 12. The status of the SBU 2, the IPP 4, and the CDIC 3 is constantly reported to the process controller 6 during these operations. The status of both, the IMAC 11 and the MEM 12, is constantly reported to the process controller 6. After the digital image data is stored, the process controller 6 displays this fact on the liquid crystal screen 14a of the operating unit 14, whereby the scan to memory operation ends.

Figure 4:
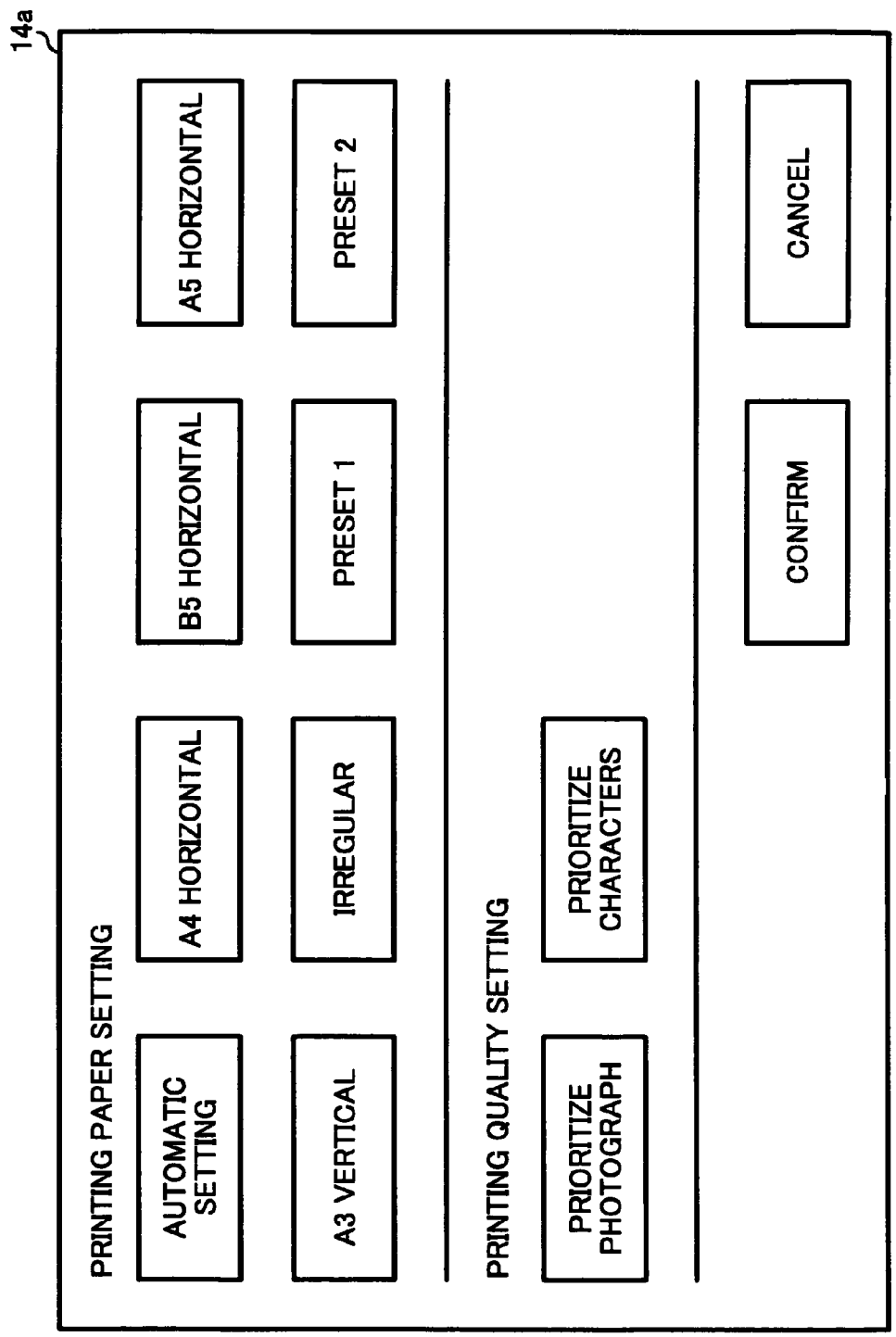
FIG. 4 is a plan view of the liquid crystal screen of the operating unit of the image processing apparatus shown in FIG. 1, for displaying a printing conditions setting screen.

In the memory to print operation, digital image data stored in the MEM 12 is output onto paper as a reproduced image. The user sets various printing conditions via the liquid crystal screen 14a of the operating unit 14 as shown in FIG. 4. When the confirm button is pressed, the printing conditions set by the user are sent to the process controller 6 and the system controller 13. The process controller 6 stores the received printing conditions in the RAM 7, and instructs the CDIC 3, the IPP 4, and the VCU 5 to execute operations based on the printing conditions. The system controller 13 stores the received printing conditions in the RAM 15, and instructs the IMAC 11 and the MEM 12 to execute operations based on the printing conditions.

After the instructions to the respective units are completed, the IMAC 11 of the image processing apparatus 1 reads the digital image data from the MEM 12 as a source of an image to be output onto paper, changes it back to the image format prior to storing, and sends it to the CDIC 3 via the parallel bus 22. The CDIC 3 sends the digital image data received from the IMAC 11 to the IPP 4. The IPP 4 executes image processing to supplement the printing conditions set by the user and the printing characteristics of the VCU 5, and sends the processed digital image data to the VCU 5. The VCU 5 reproduces the digital image data received from the IPP 4 on paper. The status of the CDIC 3, the IPP 4, and the VCU 5 is constantly reported to the process controller 6 during these operations, and so is the status of the IMAC 11 and the MEM 12. When the VCU 5 ends reproduction of the image, the process controller 6 displays this fact on the liquid crystal screen 14a of the operating unit 14, whereby the memory to print operation ends.

In the memory to network operation, digital image data stored in the MEM 12 is transmitted to the image processing apparatuses 101 and 102 (see FIG. 2) at the connection destination. The IMAC 11 reads the digital image data from the MEM 12, changes it back to the image format prior to being stored, and sends the digital image data via the parallel bus 22 to the CDIC 3. The CDIC 3 sends the digital image data received from the IMAC 11 to the IPP 4, and the IPP 4 executes image processing to convert the digital image data to an image format that can be sent across the IP network NW. The IPP 4 again sends the processed digital image data to the CDIC 3. The CDIC 3 sends the digital image data received from the IPP 4 to the NCU 9 via the parallel bus 22. The NCU 9 divides the digital image data into packet data, and sends the divided packet data to the IP network NW.

During this operation, the status of the IMAC 11, the MEM 12, and the NCU 9 is constantly reported to the system controller 13. When the NCU 9 is done outputting the digital image, the system controller 13 displays this fact on the liquid crystal screen 14a of the operating unit 14, whereby the memory to network operation ends. Because the digital image data output to the IP network NW is processed based on the communication protocol of the IP network NW, it passes through various terminals before reaching the image processing apparatuses 101 and 102 at the connection destination.

In the network to memory operation, digital image data is received from the image processing apparatuses 101 and 102 at the connection destination and stored in the MEM 12. The NCU 9 reproduces the digital image data from the packet data that arrives via the IP network NW, and sends the reproduced digital image data via the parallel bus 22 to the CDIC 3. The CDIC 3 sends the digital image data received from the NCU 9 to the IPP 4, and the IPP 4 executes image processing to convert the digital image data received from the CDIC 3 into an image format that can be easily handled by the apparatus itself. The IPP 4 again sends the processed digital image data to the CDIC 3, and the CDIC 3 sends the digital image data received from the IPP 4 to the IMAC 11 via the parallel bus 22. The IMAC 11 converts the received digital image data into a storage format specified by the MEM 12, and stores it in the MEM 12. During these operations, the status of the IMAC 11, the MEM 12, and the NCU 9 is constantly reported to the system controller 13. After storage of the digital image data ends, the system controller 13 displays this fact on the liquid crystal screen 14*a* of the operating unit 14, whereby the network to memory operation ends.

In the apply operation, the address of the apparatus itself is informed to the alias management server 200, which is a third terminal that supports transmission and reception of image information, and an alias (identification information) is obtained in return. As shown in FIG. 2, the alias management server 200 can exchange information with the image processing apparatus 1 via the IP network NW. Upon receiving an IP address from the image processing apparatus 1, the alias management server 200 records the IP address in a database in association with an alias (a four-digit integer in FIG. 2), and sends the corresponding alias to the image processing apparatus 1.

First, when the user inputs a command to obtain an alias using the operating unit 14 of the image processing apparatus 1, the system controller 13 checks the IP address of the alias management server 200 stored in the RAM 15, and sends the address of the image processing apparatus to the alias management server 200 via the NCU 9. When the alias management server 200 sends the alias to the image processing apparatus 1, the image processing apparatus 1 receives the alias from the NCU 9 and stores it in the RAM 15 via the system controller 13. After the image processing apparatus 1 correctly stores the alias, the system controller 13 displays the content of the alias on the liquid crystal screen 14*a* of the operating unit 14, whereby the apply operation ends.

In the find operation, IP addresses of the image processing apparatuses 101 and 102, which are the communication destinations, are checked based on an alias specified by the user. The user inputs the alias of a party with whom the user wants to transmit and receive image information, using the operating unit 14. When the alias is input, the system controller 13 of the image processing apparatus 1 stores the input alias in the RAM 15. The image processing apparatus 1 uses the NCU 9 to transmit the content of the alias to the alias management server 200, and requests the alias management server 200 to search for the image processing apparatuses 101 and 102 to which the same alias is appended.

When the image processing apparatus 1 requests for the IP addresses, the alias management server 200 searches for the image processing apparatuses 101 and 102 based on the received alias, and transmits the searched and found IP addresses of the image processing apparatuses 101 and 102 to the image processing apparatus 1.

The image processing apparatus 1 receives the IP addresses from the alias management server 200 via the NCU 9, and stores them in the RAM 15. After the IP addresses are correctly stored, the system controller 13 displays this fact on the liquid crystal screen 14*a* of the operating unit 14, whereby the find operation ends.

In the connect operation, a connection for transmitting and receiving image information is established with the image processing apparatuses 101 and 102, which are the communication destinations. The system controller 13 performs the find operation to check the IP addresses of the communication destinations stored in the RAM 15, and starts a connection via the NCU 9 with the image processing apparatuses 101 and 102, which are the communication destinations.

The procedure from requesting a connection with the image processing apparatuses 101 and 102 at the destinations to capability conversion, and then to establishing the connection, can comply with unique copia-to-copia specifications or with existing specifications such as session initial protocol (SIP).

After the image processing apparatus 1 completes the procedure of establishing the connection, the system controller 13 displays this fact on the liquid crystal screen 14*a* of the operating unit 14, whereby the connect operation ends.

In a negotiation operation, before transmitting and receiving the image information with the image processing apparatuses 101 and 102 at the connection destinations, a negotiation is made with the user of the image processing apparatus. For example, when a plurality of image processing apparatuses 101 and 102 are connected, a negotiation is made with each of the image processing apparatuses 101 and 102 regarding whether to transmit and receive the image information. When a fee is charged for using the image processing apparatus 1, negotiation is made regarding a method of payment. When the content of all negotiations is settled, the system controller 13 stores the negotiation results in the RAM 15, whereby the negotiation operation ends.

In the disconnect operation, when no image information is transmitted or received to or from the image processing apparatuses 101 and 102 for longer than a fixed period of time, the image processing apparatus 1 determines to break the connection with the image processing apparatuses 101 and 102. This disconnect operation is executed as a defensive measure when the image processing apparatus 1 and the image processing apparatuses 101 and 102 are left in the connected state. There are actually two steps before the disconnection, each step being executed when a fixed period of time elapses.

When the image processing apparatus 1 does not transmit or receive image information to or from the image processing apparatuses 101 and 102 during a fixed period of time, the system controller 13 displays a message for confirming the user's intentions with regard to connection, on the liquid crystal screen 14*a* of the operating unit 14. If no reply is received from the user in spite of this message being displayed, the system controller 13 invalidates the verification result of the password (alias) obtained by a prior compare operation. When the verification result of the password is invalidated, a new password must be input to restart transmission or reception of image information. If no image information is transmitted or received to or from the image processing apparatuses 101 and 102 during another fixed period of time, the system controller 13 displays a message for confirming the user's intentions with regard to breaking the connection on the liquid crystal screen 14*a* of the operating unit 14. If no reply is received from the user in spite of this message being displayed, the system controller 13 breaks the connection, whereby the disconnect operation ends.

These basic operations can be executed individually, or as a combination of a plurality of basic operations. When executing a combination of the basic operations, the various settings that are made by the user using the operating unit 14 need not be made at timings between the basic operations, and can be set together at a given timing. That is, the system controller 13 can store the contents of the settings from the operating unit 14 in the RAM 15 or the RAM 7, and read the setting contents at any time.

Effects of this embodiment will be explained next. This embodiment appropriately prevents illegitimate access while using a copia-to-copia function to enable simple and easy connection, transmission to, and reception from the image processing apparatuses 101 and 102 that are connected to the IP network NW.

The image processing apparatus 1 includes the copia-to-copia function as one of executable applications. Operation procedures of the copia-to-copia function are explained below.

Figure 5:
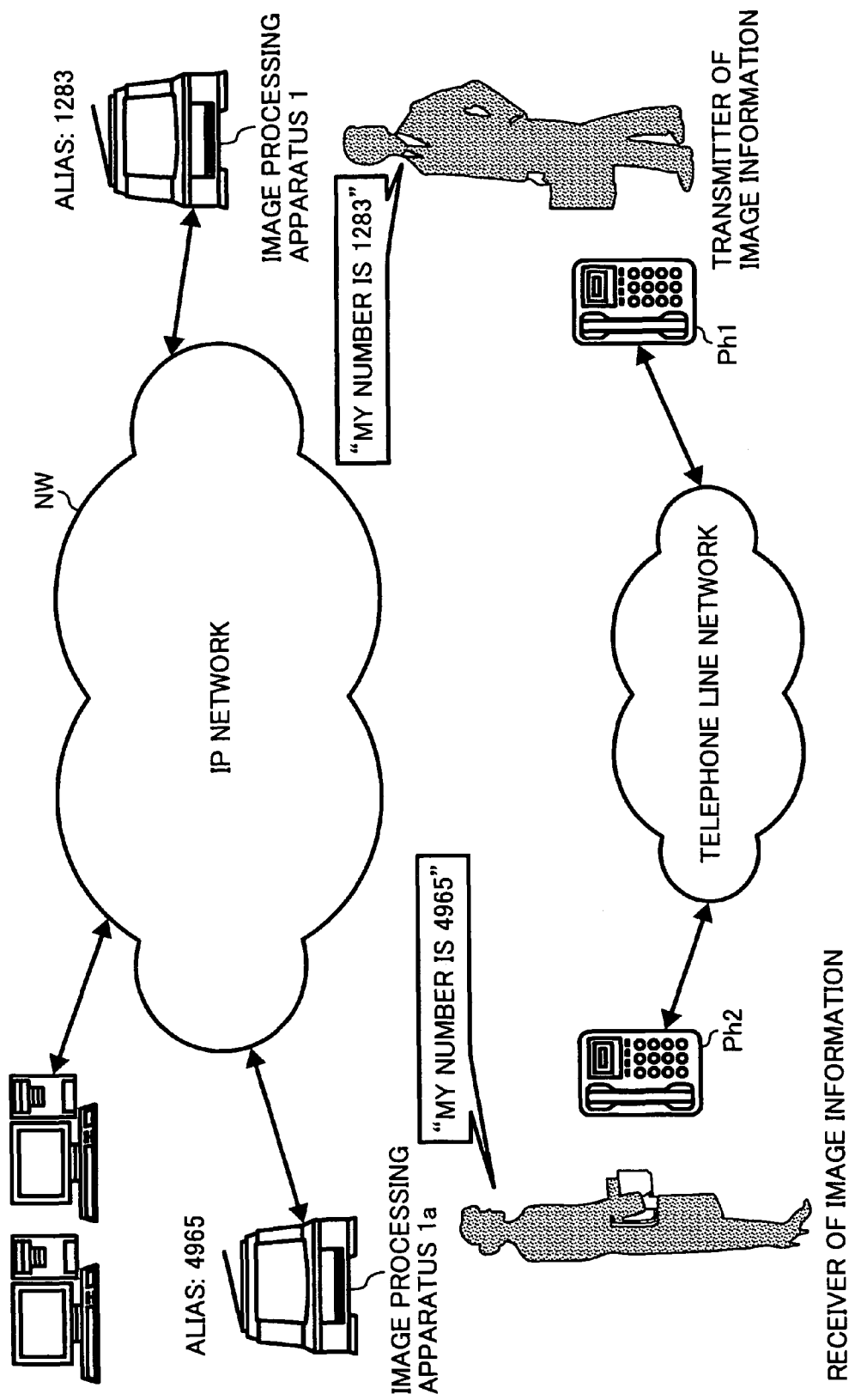
FIG. 5 is a diagram to explain copia-to-copia function performed by the image processing apparatus shown in FIG. 1.

In FIG. 5, the image processing apparatus 1 that is installed near a transmitter of image information and an image processing apparatus 1a that is installed near a receiver of the image information are connected by the IP network NW. When the transmitter of the image information and the receiver of the image information can communicate using a telephone Ph1 and a telephone Ph2 via a telephone line network, communication between the image processing apparatus 1 and the image processing apparatus 1a can be established by obtaining identification information (aliases) of the image processing apparatus 1 and the image processing apparatus 1a, which become valid only while using the image processing apparatus 1 and the image processing apparatus 1a from the IP network NW, and using the telephone Ph1 and the telephone Ph2 to inform each other of this identification information. Because the identification information is appended temporarily rather than permanently, it can be used each time by a plurality of image processing apparatuses, and short and simple identification information can be used. This enhances the usability while preventing the transmission of image information from an unidentified third party. Communication between the transmitter and the receiver of the image information is not limited to telephone, and they can communicate by chat or the like.

Figure 6:
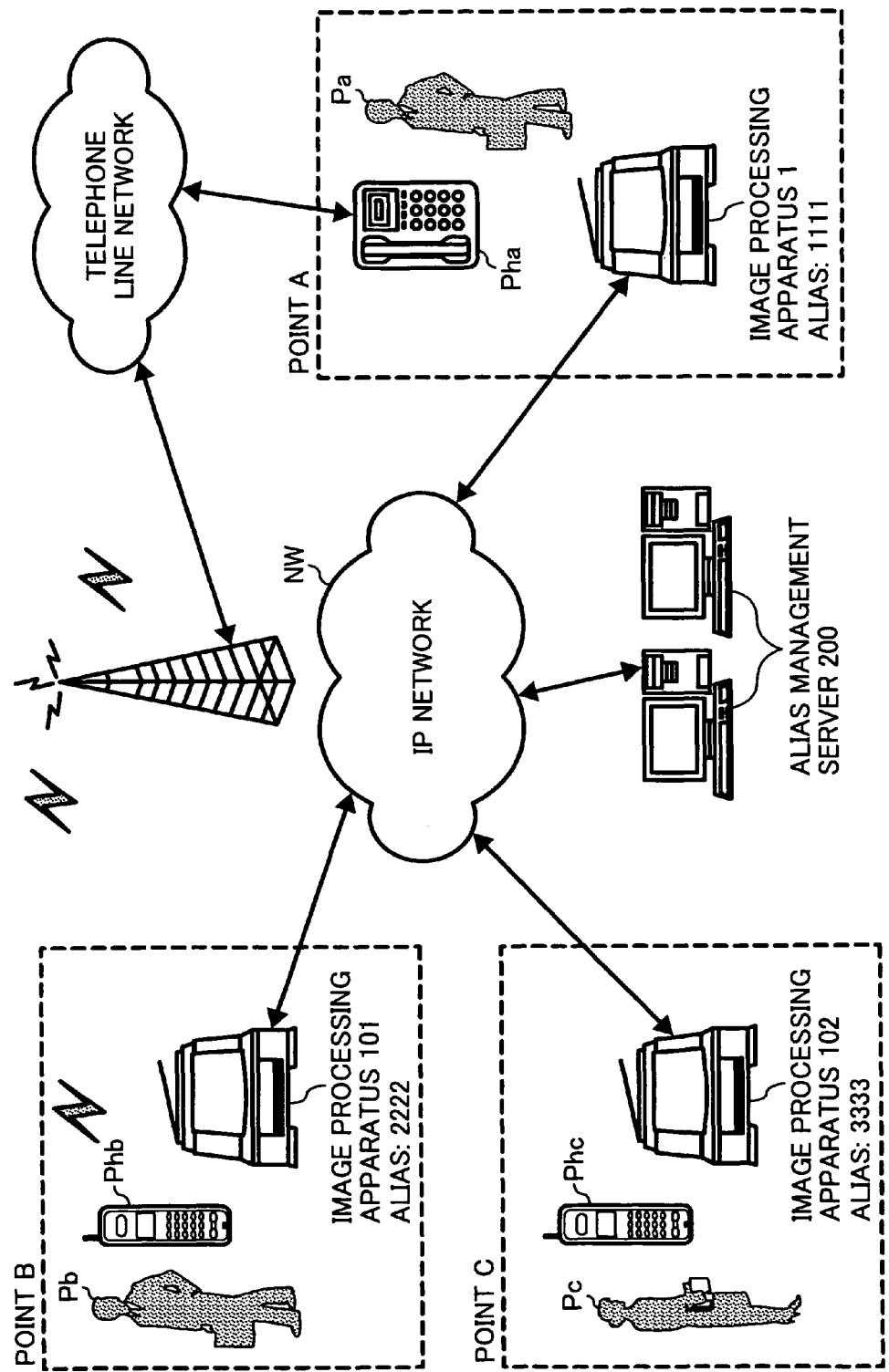
FIG. 6 is a diagram of a specific example of the copia-to-copia function performed by the image processing apparatus shown in FIG. 1.
Figure 7:
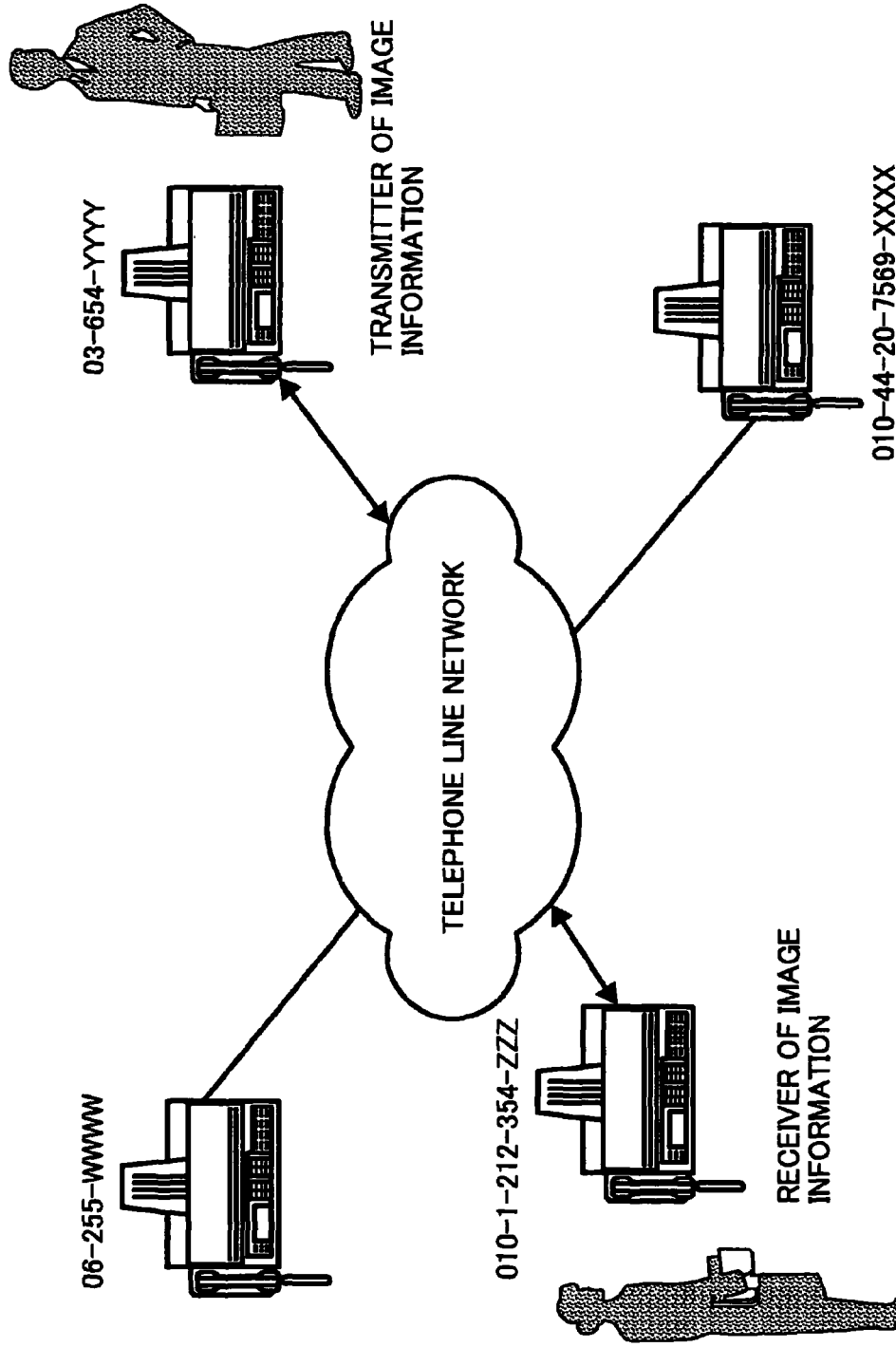
FIG. 7 is a diagram to explain facsimile communication performed by a conventional facsimile apparatus.
Figure 8:
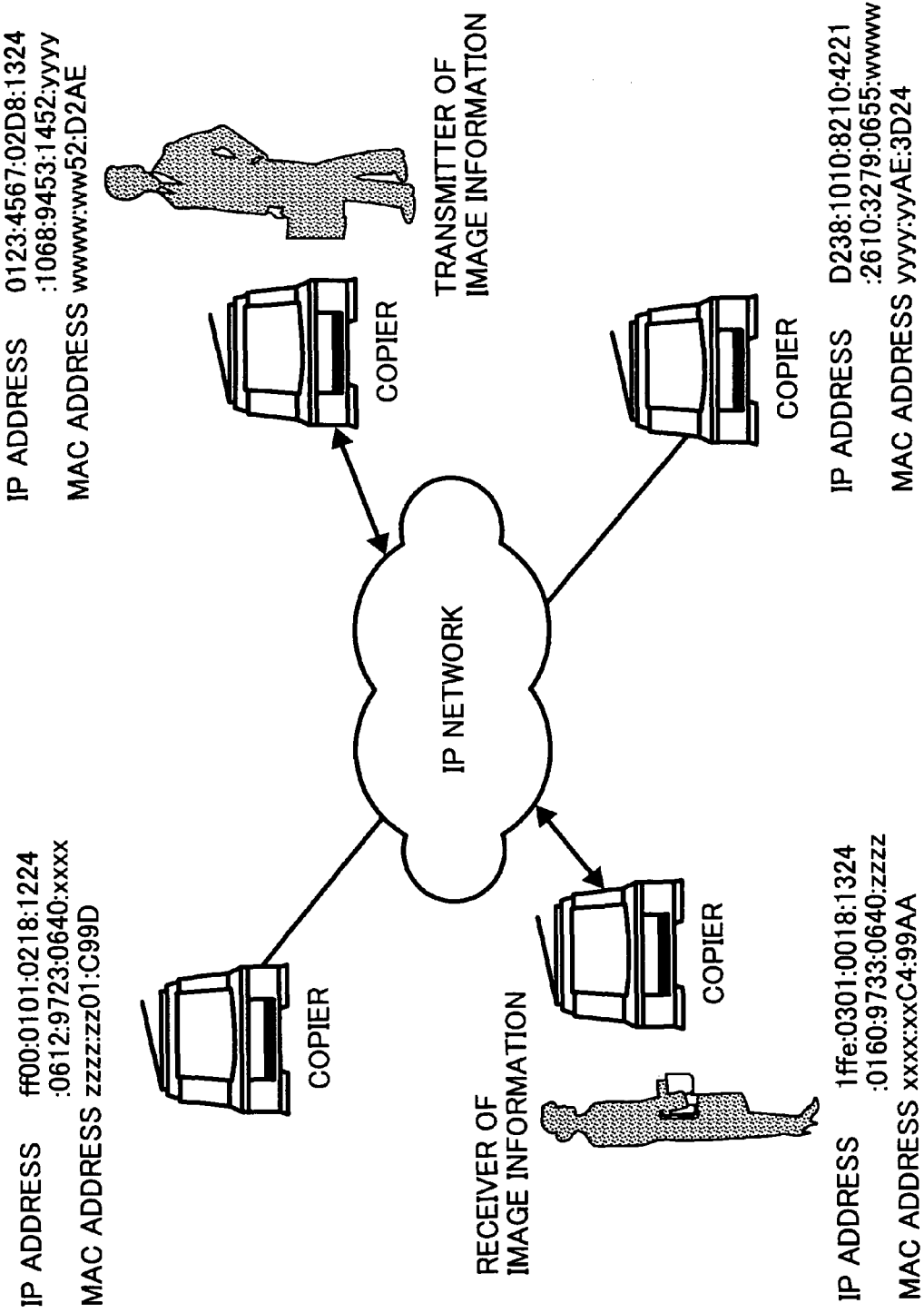
FIG. 8 is a diagram to explain the copia-to-copia using an IP network, performed by a conventional copier.

A specific usage mode will be explained with reference to FIG. 6. To simplify explanation in FIG. 6, only three image processing apparatuses (the image processing apparatus 1 of this embodiment, and two other image processing apparatuses 101 and 102), and one alias management server 200 are connected. The image processing apparatuses 1, 101, and 102 are installed at points A, B, and C, and used by users Pa, Pb, and Pc, respectively. The IP addresses of the image processing apparatuses 1, 101, and 102 are, respectively, "IP address A", "IP address B", and "IP address C". Users at the points A, B, and C are in environments where they can use telephones Pha, Phb, and Phc respectively. "Checking IN" describes a process in which the user instructs the image processing apparatus 1 of this embodiment to obtain an alias, and "checking OUT" describes a process in which the connection among the image processing apparatuses 1, 101, and 102 is broken by determination of the user.

It is assumed that the user Pa of the image processing apparatus 1 needs to pass a copy of a paper text to the user Pb. The user Pa of the image processing apparatus 1 contacts the user Pb by telephone Pha, informs the user Pb that he wishes to pass this paper text to him, and checks IN to the image processing apparatus 1. The user Pb checks IN to the image processing apparatus 101.

When the user Pa checks IN to the image processing apparatuses 1 and the user Pb checks IN to the image processing apparatus 101, the image processing apparatuses 1 and 101 send their own addresses to the alias management server 200 by performing apply operations, and obtain aliases in reply. The image processing apparatus 1 sends its IP address A and obtains an alias of "1111", while the image processing apparatus 101 sends its IP address B and obtains an alias of "2222".

When the image processing apparatuses 1 and 101 complete their apply operations, the users Pa and Pb inform each other of the aliases appended to the image processing apparatuses 1 and 101 they are using, via the telephones Pha and Phb. By this exchange of information via telephone, the user Pa learns that the alias "2222" is appended to the image processing apparatus 101, and the user Pb learns that the alias "1111" is appended to the image processing apparatus 1.

The user Pa specifies "2222" as the communication destination of the image processing apparatus 1, and the user Pb specifies "1111" as the communication destination of the image processing apparatus 101. The image processing apparatuses 1 and 101 perform find operations to transmit their respective aliases to the alias management server 200 and request a search. As a result of this search, the alias management server 200 sends the IP address B to the image processing apparatus 1, and the IP address A to the image processing apparatus 101. The image processing apparatuses 1 and 101 can therefore learn each other's IP address, and be ready to transmit and receive image information by performing a connect operation.

The user Pa then sets the paper text on the document glass of the image processing apparatus 1 and instructs for reading of the text. The image processing apparatus 1 starts a negotiation operation, and the user Pa performs main settings for copia-to-copia. At this time, any item that must be determined by consultation with the user Pb can be determined by talking on the telephone. When all setting items are confirmed and the negotiation operation ends, the image processing apparatus 1 sequentially executes a scan to memory operation and a memory to network operation, and transmits the read paper text as a digital image to the image processing apparatus 101.

Upon receiving the digital image, the image processing apparatus 101 executes a network to memory operation and a memory to print operation, thereby printing a copy of the paper text onto paper.

By the above processes, the users Pa and Pb obtain paper texts having identical content. It is assumed that a query arises during their continued discussion of the content of the paper text, and they submit a question to the user Pc.

The user Pa telephones the user Pc and informs him of the content of the question (trilateral communications takes place hereafter).

It is assumed that the user Pa is unable to adequately explain his question verbally, and decides to send a copy of the paper text to the user Pc.

The user Pc checks IN to the image processing apparatus 102. Upon check IN, the image processing apparatus 102 performs an apply operation to send its IP address C to the alias management server 200 and obtains an alias of "3333" in reply. When the image processing apparatus 102 completes this apply operation, the user Pc telephones the users Pa and Pb to inform them of the alias "3333" that is appended to the image processing apparatus 102, and the users Pa and Pb inform the Pc of the aliases appended to the image processing apparatuses 1 and 101. The user Pc then uses the operating unit 14 of the image processing apparatus 102 to specify the aliases "1111" and "2222" as the communication destinations of the image processing apparatus 102.

The image processing apparatus 102 performs a find operation that requests the alias management server 200 to search for the image processing apparatuses 1 and 101 having aliases of "1111" and "2222".

As a result of this search, the alias management server 200 sends the IP addresses A and B to the image processing apparatus 102.

By receiving the IP addresses A and B from the alias management server 200, the image processing apparatus 102 learns the IP addresses of the image processing apparatuses 1 and 101. The image processing apparatus 102 uses these IP addresses to perform a connect operation to be ready to transmit and receive image information among the image processing apparatuses 1, 101, and 102.

It is assumed that the conversation has shifted to a different topic, the user Pa does not immediately transmit the paper text to the user Pc, and instead, the three users continue their conversation. The image processing apparatuses 1, 101, and 102 are consequently left connected for a long time. Consequently, as a first step of a disconnect operation, the image processing apparatuses 1, 101, and 102 invalidate the verification results of the passwords, thereby prohibiting transmission and reception of image information.

The users Pa, Pb, and Pc notice that the first step of the disconnect operation has started, and once again input the aliases of the communication destinations. Because the first step of the disconnect operation prohibits transmission and reception of image information while maintaining the connection among the image processing apparatuses 1, 101, and 102, it is not necessary to redo the apply operation, the find operation, and the connect operation to restore this state. If the entered aliases are correct, transmission and reception of image information among the image processing apparatuses 1, 101, and 102 will be permitted.

Next, the user Pa decides to send the paper text to the user Pc, the user Pa sets the paper text on the document glass of the image processing apparatus 1 and instructs for reading of the text document.

The image processing apparatus 1 starts a negotiation operation, and the user Pa performs the main setting of copia-to-copia. At this time, items that must be determined by consultation between the users Pa, Pb, and Pc are determined by talking on the telephone.

Since the paper text need only be sent to the user Pc, the user Pa must remember to make the setting accordingly. When all the items are set and the negotiation operation ends, the image processing apparatus 1 sequentially executes a scan to memory operation and a memory to network operation, thereby transmitting the read paper text as a digital image to the image processing apparatus 102. That is, the image information can be transmitted selectively only to the image processing apparatus 102 even while both the image processing apparatuses 101 and 102 are still connected.

Upon receiving the digital image, the image processing apparatus 102 performs a network to memory operation and a memory to print operation, thereby printing a copy of the paper text held by the user Pa onto paper.

Thus, the users Pa, Pb, and Pc can obtain paper texts having identical contents, and they can converse while viewing these paper texts.

When the users Pa, Pb, and Pc are done with the discussion, they each hang up the telephone and check OUT from the image processing apparatuses 1, 101, and 102.

By executing the copia-to-copia operation in this way, it is possible to prevent illegitimate transmissions by a third party, and it is also easy and simple to transmit and receive image information via the IP network NW by copia-to-copia after specifying the destination, thereby improving the usability.

When the image processing apparatus 1 of this embodiment is connected to the plural other image processing apparatuses 101 and 102 using aliases as identification information, the operating unit 14 can be used to select whether to transmit the image information to each of the image processing apparatuses 101 and 102.

Therefore, image information can be transmitted only to specific destinations, thereby further improving the usability.

When no image information is transmitted or received to or from the image processing apparatus 1 and the other image processing apparatuses 101 and 102 for a predetermined period of time, the image processing apparatus 1 requests input of identification information from the image processing apparatuses 101 and 102, which are the communicating parties, for subsequent transmission and reception of image information.

This prevents an unauthorized third party from using the image processing apparatus 1 when the user is away from the image processing apparatus 1 for longer than a fixed period of time, thereby improving security.

When no image information is transmitted or received between the other image processing apparatuses 101 and 102, which are the communicating parties, for a predetermined period of time, the image processing apparatus 1 cuts off its connection thereto.

Therefore, when the user is away from the image processing apparatus 1 for longer than a predetermined period of time, the image processing apparatus 1 can be made available for other users and used by them, thereby improving its usability.

The image processing apparatus 1 also includes the APU 10 that charges fees to the users. The APU 10 collects usage fees from any one or both of the user of the image processing apparatus 1 and users of the image processing apparatuses 101 and 102 as communicating parties according to a predetermined ratio.

Therefore, the usage fees can be collected by a payment method determined by the users, thereby improving the usability of the fee-charging image processing apparatus 1.

A method for effectively using the image processing apparatus 1 of this embodiment will be explained next. In the explanation, the image processing apparatus 1 is described as a "CTI-compatible copier". CTI is an abbreviation of Copier Telephony Integration, a function of integrating telephones and copiers. In the image processing apparatus 1 of this embodiment, when a plurality of copiers transmit and receive image information via the IP network NW, a function of searching for a copier that will be the communicating party by checking the communication status of the user is set as one type of CTI.

As an example of a first method for using the image processing apparatus 1 (CTI-compatible copier), consider that a businessman who is en route to a sales location realizes that he has forgotten a document he intends to distribute to a client. If he returns to his workplace to retrieve it, he will be late for the appointment with the client. However, if a copier installed in a convenience store and a copier at his workplace are CTI-compatible, the document can be obtained by the following procedure.

First, the businessman uses his own mobile telephone to call his workplace and inform an employee that he has forgotten the document. The employee goes to the place where the document is kept and searches for it. The telephone can be hung up while the employee is searching. Meanwhile, the businessman enters a nearby convenience store. When the employee at the workplace finds the document, he contacts the businessman again by calling his mobile telephone.

The employee checks IN to a copier in the workplace, and the businessman checks IN to a copier in the convenience store. When they have checked IN, they exchange aliases by telephone and each inputs the other's alias into the copier. When the copiers are ready to communicate with each other, the employee at the workplace scans the document using copia-to-copia. A copy of the document is output from the copier in the convenience store.

As a second method of usage, an example of a CTI-compatible copier that is installed in a call center is explained. A call center is a department where a company handles calls from its consumers.

People who call the call center often want to know more about products and services provided by the company. The call center is therefore expected to offer adequate explanation to the consumers.

However, because explanation can only be made verbally over the telephone, the call often ends without sufficient information being given. This can lead to the customer misunderstanding or forgetting the details of the explanation.

The quality of the call center greatly affects customer satisfaction, and hence, must be improved.

If explanation could be given to consumers by using drawings and information material in addition to verbal explanation, consumer's understanding of products and services would deepen, and information could be reliably given.

If CTI-compatible copiers are installed at both the call center and at consumers' homes, the above problem can be resolved as follows.

When a consumer calls the call center and starts talking to a staff member, the consumer checks IN to a copier installed at home and the staff member checks IN to a copier at the call center. They exchange aliases while talking, and enter each other's alias into the copiers. When the copiers are ready to communicate, the staff member responds to the consumer's inquiry. If a paper text must be exchanged during the call, the sender scans the text using copia-to-copia, and a copy of the text is output from the copier of the receiver.

For example, when the inquiry relates to operation of a household electrical appliance, the staff member can send an instruction manual to the consumer. If the inquiry relates to the use of medicines, a document listing warnings and the like can be sent to the consumer.

Moreover, because the paper text remains as a record, the consumer can review the explanation made by the staff member, enabling the information to be reliably given.

As a third method of usage, an example of a businessman who is on an overseas business trip is explained. It is assumed that a planned meeting at the destination is cancelled, leaving him with one free day. Even if he wants to go sightseeing around the area, because this has not been originally scheduled, he has not brought a guidebook or the like.

Moreover, few stores overseas sell books in Japanese, and a guidebook in Japanese cannot be easily found at the location.

In such a case, if a copier installed at a hotel where the businessman stays and a copier installed at a library in Japan are compatible with CTI, travel guide information can be obtained by the following method.

The businessman calls his family using his mobile telephone and tells them that he desires tourist information for the location. His family members go to the nearest library and search for a tourist guidebook. The phone can be hung up while they search. If they find a guidebook, they call the businessman to inform him of this fact, and check IN to the copier at the library. The businessman checks IN to the copier at his hotel. After check IN of the respective copiers is complete, they exchange aliases over the telephone and enter the aliases into the copiers. When the copiers are ready to communicate, the family can use copia-to-copia to scan the guidebook, and a copy of the guidebook can be output from the copier onto paper at the hotel where the businessman is staying.

According to the image processing apparatus and the network system of the present invention, illegitimate transmissions by a third party are prevented, and image information can be easily transmitted and received via the IP network to a specific destination, thereby improving the usability.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image processing apparatus having its own IP address and connected to an IP network to which a management server is connected, the management server assigning identification information to the image processing apparatus corresponding to the IP address of the image processing apparatus for a first predetermined limited period, the identification information being simpler than the IP address, and all connections being based on IP addresses, the image processing apparatus comprising:

an address informing unit that informs the IP address of the image processing apparatus to the management server via the IP network;

an image processing unit that executes predetermined image processing of image information that is obtained by optically reading a document;

a transmitting/receiving unit that transmits/receives processed image information to another image processing apparatus connected to the IP network; and a connection control unit that, when the management server assigns the identification information, connects to the IP network during the first predetermined limited period using the identification information, informs identification information of a communicating image processing apparatus to the management server, acquires and stores the IP address corresponding to the identification information of the communicating image processing apparatus, and when the identification information of the communicating image processing apparatus is input by a user, requests connection to the IP network using stored IP address of the communicating image processing apparatus, for any one of transmitting and receiving the processed image information, wherein when the first predetermined limited period expires, transmission/reception by the image processing apparatus using the identification information is prohibited while the connection to the IP network remains established, a second predetermined limited period starts to run after expiration of the first predetermined limited period, if the identification information is input before expiration of the second predetermined limited period, then transmission/reception by the image processing apparatus is permitted, and if the identification information is not input before expiration of the second predetermined limited period, then the connection to the IP network is broken.

2. The image processing apparatus according to claim 1, wherein
the image processing apparatus is connected to a plurality of other image processing apparatuses each having its own identification information, and
the transmitting/receiving unit decides, with respect to each of the other image processing apparatuses, whether to transmit the processed image information.

3. The image processing apparatus according to claim 1, wherein
the image processing apparatus is connected to a plurality of other image processing apparatuses each having its own identification information, and
a user specifies the communicating image processing apparatuses for transmitting and receiving the processed image information.

4. The image processing apparatus according to claim 1, wherein
there is no exchange of information with the communicating image processing apparatus for a predetermined period of time, and
at the time of any one of transmitting and receiving the processed image information after the predetermined period of time, the connection control unit requests, once again, for an input of identification information of the communicating image processing apparatus.

5. The image processing apparatus according to claim 1, wherein
the processed image information is not transmitted to and received from the communicating image processing apparatus for a predetermined period of time, and
the connection control unit breaks connection with the communicating image processing apparatus, after the predetermined period of time has elapsed.

6. The image processing apparatus according to claim 1, further comprising:
a charging unit that charges and collects a usage fee from at least one of a user of the image processing apparatus itself and a user of a communicating image processing apparatus, at an arbitrary ratio.

7. A network system, comprising:
an IP network in which all connections are based on IP addresses;
a plurality of image processing apparatuses connected to the IP network and each having its own IP address; and
a management server connected to the IP network, and that assigns identification information to an image processing apparatus corresponding to the IP address of the image processing apparatus for a first predetermined limited period, the identification information being simpler than the IP address, wherein
a first image processing apparatus executes predetermined image processing of image information that is obtained by optically reading a document, and transmits/receives processed image information to a second image processing apparatus connected to the IP network,
each image processing apparatus informs its own IP address to the management server via the IP network,
the management server assigns the identification information to each image processing apparatus that informs its IP address, and
each image processing apparatus
connects to the IP network during the first predetermined limited period using its own identification information,
informs identification information of a communicating image processing apparatus to the management server,
acquires and stores the IP address corresponding to the identification information of the communicating image processing apparatus, and
when the identification information of the communicating image processing apparatus is input by a user, requests connection to the IP network using stored IP address of the communicating image processing apparatus, for any one of transmitting and receiving the processed image information, wherein
when the first predetermined limited period expires, transmission/reception by the image processing apparatus using the identification information is prohibited while the connection to the IP network remains established,
a second predetermined limited period starts to run after expiration of the first predetermined limited period,
if the identification information is input before expiration of the second predetermined limited period, then transmission/reception by the image processing apparatus is permitted, and
if the identification information is not input before expiration of the second predetermined limited period, then the connection to the IP network is broken.

8. A method of communication for exchanging processed image information within an IP network in which all connections are based on IP addresses, wherein a management server is connected via the IP network to a plurality of image processing apparatuses each having its own IP address, the method comprising:
the image processing apparatus informing the management server of its own IP address;
the management server assigning to the image processing apparatus, after the act of informing, identification information corresponding to the IP address of the image processing apparatus for a predetermined limited period, the identification information being simpler than the IP address;
the image processing apparatus informing identification information of a communicating image processing apparatus to the management server, acquiring and storing an IP address corresponding to the identification information of the communicating image processing apparatus;
the image processing apparatus transmitting/receiving processed image information to the communication image processing apparatus using stored identification information;
the management server prohibiting transmission/reception by the image processing apparatus using the identification information while maintaining the established connection to the IP network when the first predetermined limited period expires;
the management server starting to run a second predetermined limited period after expiration of the first predetermined limited period;
the management server permitting transmission/reception by the image processing apparatus if the identification information is input before expiration of the second predetermined limited period; and
the management server breaking the connection to the IP network if the identification information is not input before expiration of the second predetermined limited period.

* * * * *